Patented Oct. 23, 1934

1,978,102

UNITED STATES PATENT OFFICE 1,978,102

COMPOSITION FOR GERMINATING SEEDS AND ITS PREPARATION

Albert L. Clapp, Danvers, Mass., assignor to Paprex Fibre Co., Danvers, Mass., a corporation of Massachusetts No Drawing. Application February 28, 1929, Serial No. 343,564. Renewed September 20, 1933

12 Claims. (Cl. 47—1)

This invention relates to the art of germinating and growing seeds, being also concerned with a composition highly suitable for this purpose and with its method of manufacture.

It is well known that seeds should be germinated and grown in soil which serves to carry air, moisture, and nutriment to the roots of the plant. The absorption of water and nutriment by the plant takes place largely through the slender, thread-like roots commonly called hair roots, so that the greater the number of hair roots, the more rapid the growth of the plant. The hair roots are of short life, but as the roots upon which the hair roots grow push their way from the soil, new hair roots are formed, while the old hair roots die. During transplanting, the hair roots are sometimes broken or injured, thus causing retardation of further growth, since no matter how abundant the supply of water or nutriment may be, the plant grows no faster than the hair roots take up such water or nutriment.

The composition of the present invention is designed to germinate and grow seeds quickly and to furnish humus when incorporated into the soil, thus obviating the necessity of a special conditioning treatment of the soil for planting. In accordance with the present invention, a composition comprising cellulose fiber, preferably in felted sheet form such as produced on papermaking machines, is provided, in which seeds may be germinated and which is of sufficient porosity to promote the growth of hair roots. Further, in accordance with the present invention, seeds are germinated and grown in a composition of this type, preferably containing sawdust and/or other absorbent material, such as moss, or charcoal, either before or after the composition is associated with the soil. Not only has it been found that seeds may be quickly germinated and grown in such a composition, but that it serves as a valuable addition to the soil. The composition may be used to advantage in bulk form, but, as stated, it is preferable to form it into sheet material on machinery of the papermaking type, so that seeds may be planted therein and allowed to germinate and grow under controlled conditions, whereupon the sheet material may be placed on or incorporated into the soil without disturbing the hair roots of the plants, and their growth continued. Such sheet material also serves to prevent erosion or washing away of the sod due to heavy rains, and, being of sufficient strength to resist disintegration merely by the action of water, is itself uninjured by such rains, although under sufficient weathering or under plow action, it can be disintegrated and incorporated into the soil. The use of such sheet material makes possible the transplanting of tender sprouts such as those of cucumber, corn, melon, or the like, without danger of killing them, since after the seeds have germinated, the sheet material may be placed on the soil and the growth of the sprouts continued until they have penetrated into the soil. Such transplanting may be done even on sunny days, as the sheet material may be handled in moist or wet condition, so that wilting of the sprouts may be avoided. When laid on the soil, it acts as a barrier against weeds or other undesirable growths in the soil, and, being initially sterile, remains free from such growths until seeds are carried thereon from outside sources. If desired, the seeds may be planted close together in the sheet material, whereupon after germination has taken place, the sheet material may be disintegrated as by tearing into pieces in which the roots of one or more sprouts are embedded, and the pieces then incorporated into the soil.

Inasmuch as grass may be rapidly and thickly grown in such sheet material, it may be used to advantage in making greens and lawns, even where, due to the slope of the land or the muddy or sandy characteristics of the soil, good grass growth is under usual conditions not favored, due, for example, to erosion or washing away of the soil containing the seeds or young plants. The sheet material may be rapidly laid in such places, either before or after planting of the grass seed, to produce good grass growth, the continued growth of the grass resulting in penetration into the underlying soil and the sheet material eventually disintegrating and merging with the soil. The surface thus produced on the soil is characterized by its resiliency and firmness, so that freshly made greens or lawns made with the sheet material may be walked over or mowed without being marred or dented.

An important advantage of the sheet material is that it makes possible the indoor planting of seeds in any desired planting pattern, the planting being done as on a table so as to avoid the necessity of stooping. After planting has thus been effected, the sheet material may be placed in an atmosphere of warmth and moisture designed to promote rapid germination and growth of the seeds, whereupon after sprouting has taken place, the sheet material may be placed on the soil where transplanting is desired. If some of the seeds do not germinate, this may be readily detected and fresh seeds planted, so that the desired planting pattern may be ensured before transplanting. Before planting the seeds, the sheet material may be initially wetted with water and the seeds placed on or embedded in the sheet material to produce any desired arrangement of plants.

The cellulose pulp makes possible the sheeting of the composition on a paper machine, while the sawdust or other absorbent material, such as sea moss or peat moss, or charcoal, serves to increase the porosity and water absorbency of the sheet. Preferably, a coarse type of cellulose fiber, such as ground-wood or chemical wood pulp screenings, straw, hemp, jute, manila, bagasse, cornstalk, or the like is used as a raw material in order to increase porosity and water absorbency. The fiber should be so beaten out as to produce a free stock which may be formed into a porous or open sheet on a paper machine. Inasmuch as most plants grow best under neutral conditions it is preferable to neutralize the composition, particularly when sawdust, which is likely to produce a condition of distinct acidity owing to its resin content, is used, but for those plants which thrive best under an acid or alkaline condition, the pH value of the stock may be closely regulated to produce the particular condition of acidity or alkalinity desired. This may be accomplished by the addition of alkali, the composition preferably being heated to ensure thorough reaction between the acidic constituents and the alkali. Preferably, a fertilizer or material which furnishes plant nutriment is incorporated into the composition to stimulate plant growth and to improve the soil to which the composition is added. Various fertilizers may be used, such, for example, as ammonium phosphate, tricalcium phosphate, potassium salts, bone meal, fish scrap, and the like. I have found, however, that leather is distinctly preferable for this purpose as leather is available in large quantities as a waste material, as in the form of skivings, and does not injure seedlings, whereas an oversupply of commercial fertilizers of the chemical type may prove injurious. The leather also improves the composition of sheeting, since when beaten it yields fibers which increase the strength and resiliency of the resulting sheet material. When leather is used, alkali should be added in amount sufficient to neutralize the acidic components present therein. In certain instances, it may be desirable to incorporate seeds, such as those of grass, into the stock before it is sheeted, to ensure a uniform distribution of seeds through the resulting sheet material and to avoid the necessity of subsequent planting. If desired, a suitable adhesive may be spread or painted as a thin layer or film on the surface of the sheet material, so that seeds when sprinkled thereon will adhere thereto. Preferably, a water-soluble adhesive, such as glue or starch, is used for this purpose, so that it may be dissolved by the action of water.

The raw materials, together with sufficient water, may be mixed and neutralized in a beater engine, whereupon the composition may be dewatered to the desired water content and used in bulk condition, for instance as a mulch, or it may be moulded into such articles as flower pots, designed for transplanting into the soil. If desired, minute apertures may be punched, blown, or otherwise formed in such moulded articles to increase their porosity. Preferably, however, it is sheeted on a paper machine, the sheet material being used for the germination of seeds as hereinbefore described, or, if desired, as a mulch.

Various proportions of cellulose fiber, sawdust, and scrap leather may be used in producing the material of the present invention. One procedure which has been found to give a product having excellent characteristics may be prepared as follows. Forty parts of leather, such as tanned leather skivings, are placed in a beater engine, together with 20 parts of ground-wood screenings and 40 parts of sawdust of, say, 20 mesh. Sufficient water is then added to ensure circulation of the mass. The beater is set in operation and an alkali such as soda ash is added to neutralize the acid components associated with the raw materials and to facilitate disintegration of the leather. About 5 parts of soda ash may be necessary for this purpose. Preferably, the mass is heated, as by injecting steam thereinto, to produce a temperature of, say, about 150° F., as this ensures thorough reaction between the acidic components associated with the raw materials and the alkali, and a free stock which results in highly porous sheet material. After about two or three hours, the mass is sufficiently disintegrated to permit sheeting. Inasmuch as a certain amount of leather is dissolved by the alkali and it is desired to retain this dissolved material, a precipitant such as alum or other acidic agent is added to precipitate the dissolved leather, say, about 3 to 4 parts being used for this purpose. The alum renders the stock acid, so that an alkali must again be added to bring it back to a neutral condition. Preferably, a comparatively weak alkali, such as lime, is added at this point, so as to avoid further reaction with the leather and the danger of rendering the stock too strongly alkaline. About 4 to 5 parts of lime may be necessary to convert the stock to a safely neutral condition. The stock may be run off on a wet machine, and wound on the make-up roll to any desired caliper,—for instance a thickness of about 150 points. Such sheet material is highly porous, being capable of absorbing about seven to eight times its weight of water, so that it may carry sufficient water and yet without stifling plant growth, as some of the pores may be filled with water and others with air. Owing to the high water absorptivity of the sheet material, the nutriment which stimulates plant growth may thus be supplied in dilute form to the hair roots, in which condition the hair roots take up rather than reject such nutriment, thus accelerating plant growth. If desired, fungicides or insecticides such as sulphur, formaldehyde, phenolic compounds, or the like, may be incorporated into the stock prior to its sheeting, thus protecting the seeds and roots from the ravages of fungi or other pests.

It will be observed that the composition produced in accordance with the present invention is free from water-proofing materials such as waxes or asphalts, as the object of my invention is to provide a composition, preferably in sheet form, which is porous, water-absorbent, and capable of easy disintegration even by mere weathering for a sufficient length of time.

Having thus described the composition of the present invention, its method of manufacture, and its various applications, it should be evident to those skilled in the art that various changes and modifications might be made therein without departing from the spirit or scope of invention as defined by the appended claims.

I claim:

1. A substantially neutral composition particularly adapted for germinating and growing seeds, comprising feltable cellulose fiber, sawdust, and a fertilizer, the condition of substantial neutrality of such composition arising from the addition thereto of neutralizing alkali made up at least in part of lime.

2. Sheet material particularly adapted for germinating and growing seeds, comprising cellulose fiber, sawdust, and a fertilizer.

3. Sheet material particularly adapted for germinating and growing seeds, comprising cellulose fiber and sawdust in substantially neutral condition.

4. A composition particularly adapted for germinating and growing seeds, comprising feltable leather fiber, sawdust, and feltable cellulose fiber.

5. A substantially neutral composition particularly adapted for germinating and growing seeds, comprising feltable leather fiber, sawdust, and feltable cellulose fiber.

6. A step which comprises beating cellulose pulp and sawdust in the presence of alkali at elevated temperature.

7. A step which comprises beating leather, an absorbent material, and cellulose pulp in the presence of alkali at an elevated temperature.

8. Steps which comprise beating leather, an absorbent material, and cellulose pulp in the presence of alkali at elevated temperature, adding an acidic agent to precipitate the dissolved leather, and neutralizing with lime.

9. A substantially neutral composition particularly adapted for germinating and growing seeds, comprising leather fiber, sawdust, cellulose pulp, and precipitated, previously-dissolved leather.

10. A composition particularly adapted for germinating and growing seeds comprising feltable leather fiber, sawdust, and feltable cellulose fiber, the sawdust and the cellulose fiber each being present in amount not greater than the leather fiber.

11. A substantially neutral composition particularly adapted for germinating and growing seeds comprising feltable leather fiber, sawdust, and feltable cellulose fiber, the sawdust and the cellulose fiber each being present in amount not greater than the leather fiber.

12. A composition particularly adapted for germinating and growing seeds comprising feltable leather fiber, sawdust, and feltable cellulose fiber, the feltable fiber being present in amount by weight not more than one-half of the sawdust but each of these ingredients being present in amount not greater than the leather fiber.

ALBERT L. CLAPP.